US009108571B2

(12) United States Patent
Bort

(10) Patent No.: US 9,108,571 B2
(45) Date of Patent: Aug. 18, 2015

(54) METHOD, SYSTEM, AND COMPUTER PROGRAM PRODUCT FOR IMAGE CAPTURE POSITIONING USING A PATTERN OF INVISIBLE LIGHT

(75) Inventor: David Bort, Mountain View, CA (US)

(73) Assignee: Google Inc., Mountain View, CA (US)

( * ) Notice: Subject to any disclaimer, the term of this patent is extended or adjusted under 35 U.S.C. 154(b) by 918 days.

(21) Appl. No.: 13/316,728

(22) Filed: Dec. 12, 2011

(65) Prior Publication Data

US 2015/0158429 A1 Jun. 11, 2015

(51) Int. Cl.
*H04N 7/18* (2006.01)
*B60R 1/00* (2006.01)
*H04N 5/74* (2006.01)

(52) U.S. Cl.
CPC .. *B60R 1/00* (2013.01); *H04N 5/74* (2013.01); *B60R 2300/10* (2013.01); *B60R 2300/20* (2013.01)

(58) Field of Classification Search
CPC .. B60R 1/00; B60R 2300/10; B60R 2300/20; H04N 5/74
USPC .......................................................... 348/135
See application file for complete search history.

(56) References Cited

U.S. PATENT DOCUMENTS

| 6,351,720 | B1 | 2/2002 | Hoshina |
| 7,656,459 | B2 | 2/2010 | Catanzaro |
| 7,667,198 | B2 | 2/2010 | Strandemar |
| 7,671,890 | B2 | 3/2010 | Wentworth |
| 7,721,967 | B2 | 5/2010 | Mueller |
| 7,950,539 | B2 | 5/2011 | Henriksson |
| 2009/0320554 | A1 | 12/2009 | Watabe |
| 2009/0326718 | A1 | 12/2009 | Bryfors |
| 2010/0030069 | A1 | 2/2010 | Peter |
| 2010/0282842 | A1 | 11/2010 | Mueller |
| 2011/0102744 | A1 | 5/2011 | Saad |

FOREIGN PATENT DOCUMENTS

GB 2319081 A 5/1998

OTHER PUBLICATIONS

Christopher, Mei, et al., "Calibration Between a Central Catadioptric Camera and a Laser Range Finder for Robotic Applications", Proceedings of the 2006 IEEE International Conference on Robotics and Automation, May 2006, pp. 532-537, Orlando, FL.
Bacca, E.B., et al., "Embedding Range Information in Omnidirectional Images Through Laser Range Finder", The 2010 IEEE/RSJ International Conference on Intelligent Robots and Systems, Oct. 18-22, 2010, pp. 2053-2058, Taipei, Taiwan.

*Primary Examiner* — Allen Wong
(74) *Attorney, Agent, or Firm* — Lerner, David, Littenberg, Krumholz & Mentlik, LLP

(57) ABSTRACT

Systems, methods, computer programs, and user interfaces are provided to project, by a projection device, a pattern of invisible light onto a surface; position a vehicle at an image capture position on the surface, the vehicle including an image capture device oriented to capture an image of a view at the image capture position; capture, by an invisible light sensor connected to the vehicle, a pattern image at the image capture position, the pattern image including at least a portion of the pattern of invisible light projected onto the surface; and send the pattern image to an application server, the application server determining the image capture position relative to the projection device based on the portion of the pattern of invisible light.

21 Claims, 9 Drawing Sheets

METHOD, SYSTEM, AND COMPUTER PROGRAM PRODUCT FOR IMAGE CAPTURE POSITIONING USING A PATTERN OF INVISIBLE LIGHT

TECHNICAL FIELD

The present disclosure relates to a process for image capture positioning using a pattern of invisible light. More specifically, embodiments of the present disclosure use a pattern of invisible light projected onto a surface to determine a position of a vehicle collecting images on the surface.

BACKGROUND

Photographs of geographically distributed features (e.g., buildings, roads, or natural vistas) are useful in a variety of applications. For example, map services may store images of geographically distributed features and provide those images to users in response to a user request for images near or of a geographic location. It may also be useful to obtain photographs of the interior of structures such as buildings, stadiums, museums, etc. The interior photographs are useful for constructing models of the structures, e.g., interior photographs of a museum may be used to construct a virtual model of the museum that can be accessed via the Internet.

Certain applications based on interior images of structures often have an incomplete set of images. Certain portions of the structure may not be imaged, or certain perspectives of the structure may not be imaged. Further, the interior images of the structure may lack desirable attributes, such as pose or position information that may be used to position the interior images (e.g., relative to other images, relative to the surface of the Earth), etc.

SUMMARY

Various embodiments of systems, methods, computer programs, and user interfaces for image capture positioning using a pattern of invisible light are described herein. In some aspects, provided are a system, method, computer program, and user interface for projecting, by a projection device, a pattern of invisible light onto a surface; positioning a vehicle at an image capture position on the surface, the vehicle including an image capture device oriented to capture an image of a view at the image capture position; capturing, by an invisible light sensor connected to the vehicle, a pattern image at the image capture position, the pattern image including at least a portion of the pattern of invisible light projected onto the surface; and sending the pattern image to an application server, the application server determining the image capture position relative to the projection device based on the portion of the pattern of invisible light.

In some aspects, the pattern of invisible light includes a number of overlapping concentric circles, an array of variable sized points of light, a grid, a moiré pattern, a number of polygons, a number of alphanumeric labels, or a number of undulating lines. In some aspects, the image capture position relative to the projection device is determined by uniquely identifying a relative location of the portion in the pattern of invisible light.

In some aspects, the system, method, computer program, and user interface are further for capturing a number of images while the vehicle is moved from a first position to a second position on the surface, capturing a number of pattern images while the vehicle is moved from the first position to the second position, and sending the images and the pattern images to the application server, the application server determining a corresponding image capture position of the vehicle relative to the position device for each of the images based on a related pattern image of the pattern images.

In some aspects, the system, method, computer program, and user interface are further for calibrating an image collection device, operatively connected to the image capture device, by using the pattern of invisible light to determine a location of the projection device, where the image capture position relative to the projection device is further determined based on the location of the projection device.

In some aspects, the pattern of invisible light is a pattern of infrared light.

In some aspects, the system, method, computer program, and user interface are further for storing a pattern configuration on the projection device, where the pattern of invisible light is projected based on the pattern configuration and determining a global location of the projection device.

In some aspects, the system, method, computer program, and user interface are further for capturing an image of a view at the image capture position and sending the image and the pattern image to the application server, the application server determining a global location of the view based on the global location of the projection device and the image capture position relative to the global location of the projection device.

Figure 1A:
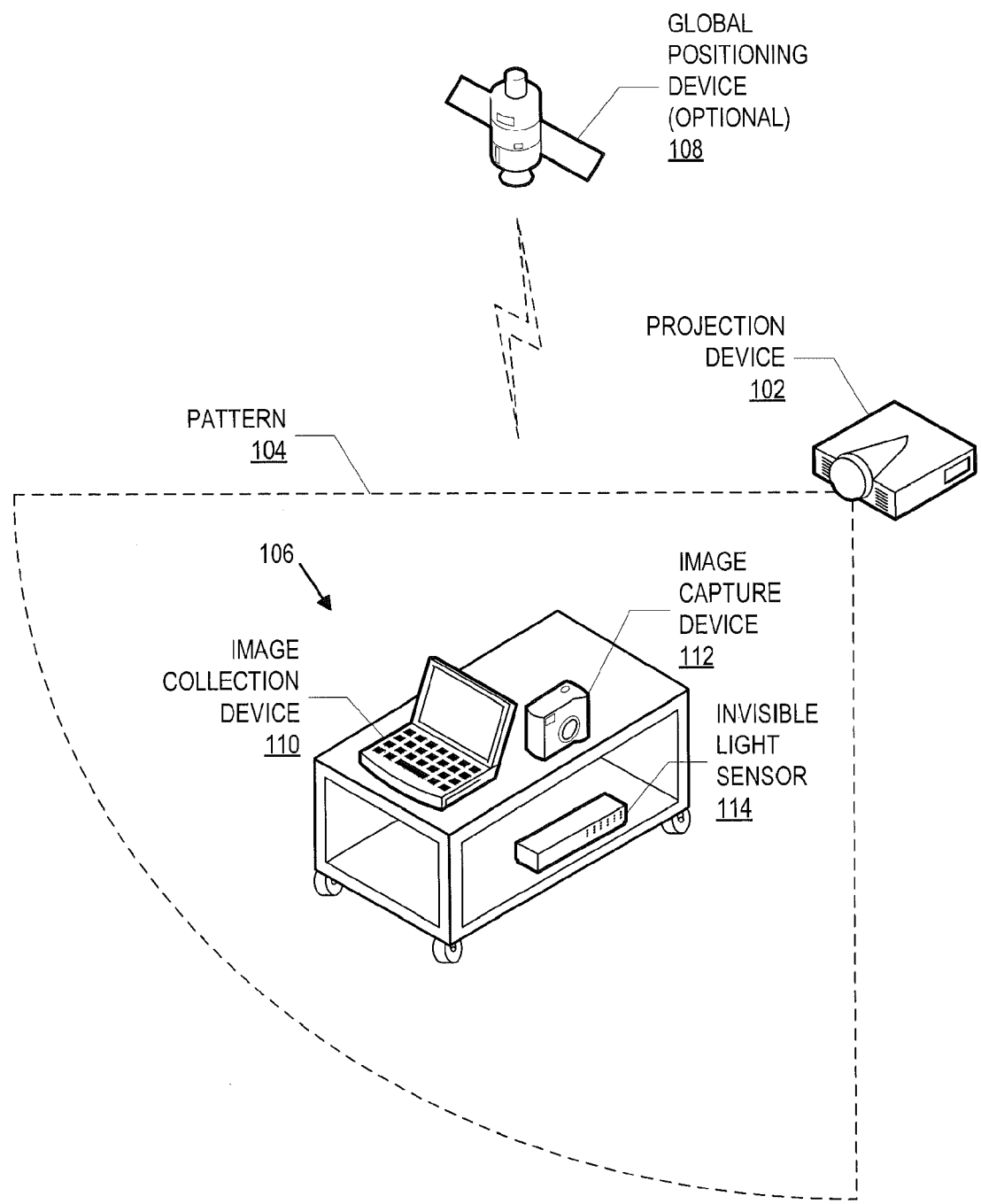
FIGS. 1A-1B and 2A-2D show diagrams of systems in accordance with one or more embodiments.

While image capture positioning using a pattern of invisible light is susceptible to various modifications and alternative forms, specific embodiments thereof are shown by way of example in the drawings and will herein be described in detail. The drawings may not be to scale. It should be understood, however, that the drawings and detailed description thereto are not intended to limit image capture positioning using a pattern of invisible light to the particular form disclosed, but to the contrary, the intention is to cover all modifications, equivalents, and alternatives falling within the spirit and scope of the present disclosure as defined by the appended claims.

DETAILED DESCRIPTION

As discussed in more detail below, provided in some embodiments are systems and methods for image capture positioning using a pattern of invisible light, which may useful for obtaining images for a map service or other applications in which images are presented or analyzed. In one embodiment, the process for image capture positioning using an invisible pattern projecting a pattern of invisible light onto a surface, positioning a vehicle at a vehicle position on the surface, capturing a pattern image comprising at least a portion of the pattern projected onto the surface, and determining the vehicle position relative to the projection device based on the portion of the pattern. Examples of invisible light are infrared light and ultraviolet light.

FIG. 1A shows a diagram of a system in accordance with one embodiment. The system of this embodiment includes a projection device 102 and an image capture system 106. In some embodiments, the system includes a global positioning device 108. FIG. 2A-2D describes further aspects of the aforementioned components of FIG. 1A.

In some embodiments, the global positioning device 108 broadcasts radio frequency ("RF") signals that may be received by a number of devices (e.g., projection device 102, image capture device 112, etc.). Each of the devices (e.g., projection device 102, image capture device 112, etc.) may use the RF signals to determine their location, e.g., their global geographic location or their location relative to some reference point, such as a center of a city, a building, or some arbitrarily selected reference. For example, the projection device 102 may be configured to determine its global geographic location based on the RF signals from the global positioning device 108.

In some embodiments, the image collection system 106 includes an image collection device 110, an image capture device 112, and an invisible light sensor 114. The image collection device 110 may be a smartphone, a tablet computer, a laptop computer, etc. The image collection device 110 is operably connected to the image capture device 112, which is configured to capture images as directed by the image collection device 110. The image collection device 110 may then associate relative location information with each image. Specifically, the image collection device 110 may be operably connected to an invisible light sensor 114 that may be configured to obtain pattern images of a pattern of invisible light 104 projected by a projection device 102. The image collection 110 device may associate the pattern images with images captured by the image capture device 112.

In some embodiments, the image collection system 106 is a vehicle that is configured to be repositioned at a location for collecting images. Locations for capturing images may include the interior of a building, a stadium, or some other structure. For example, the image collection system 106 may be a motorized vehicle having an image collection device 110, an image capture device 112, and an invisible light sensor 114. In this example, the user may direct the image collection system 106 throughout the location as images and pattern images are collected by the image capture device 112 and the invisible light sensor 114, respectively. In another example, the image collection system 106 may be affixed to a pedestrian, where the pattern images and images are collected as the pedestrian walks throughout the location.

Figure 1B:
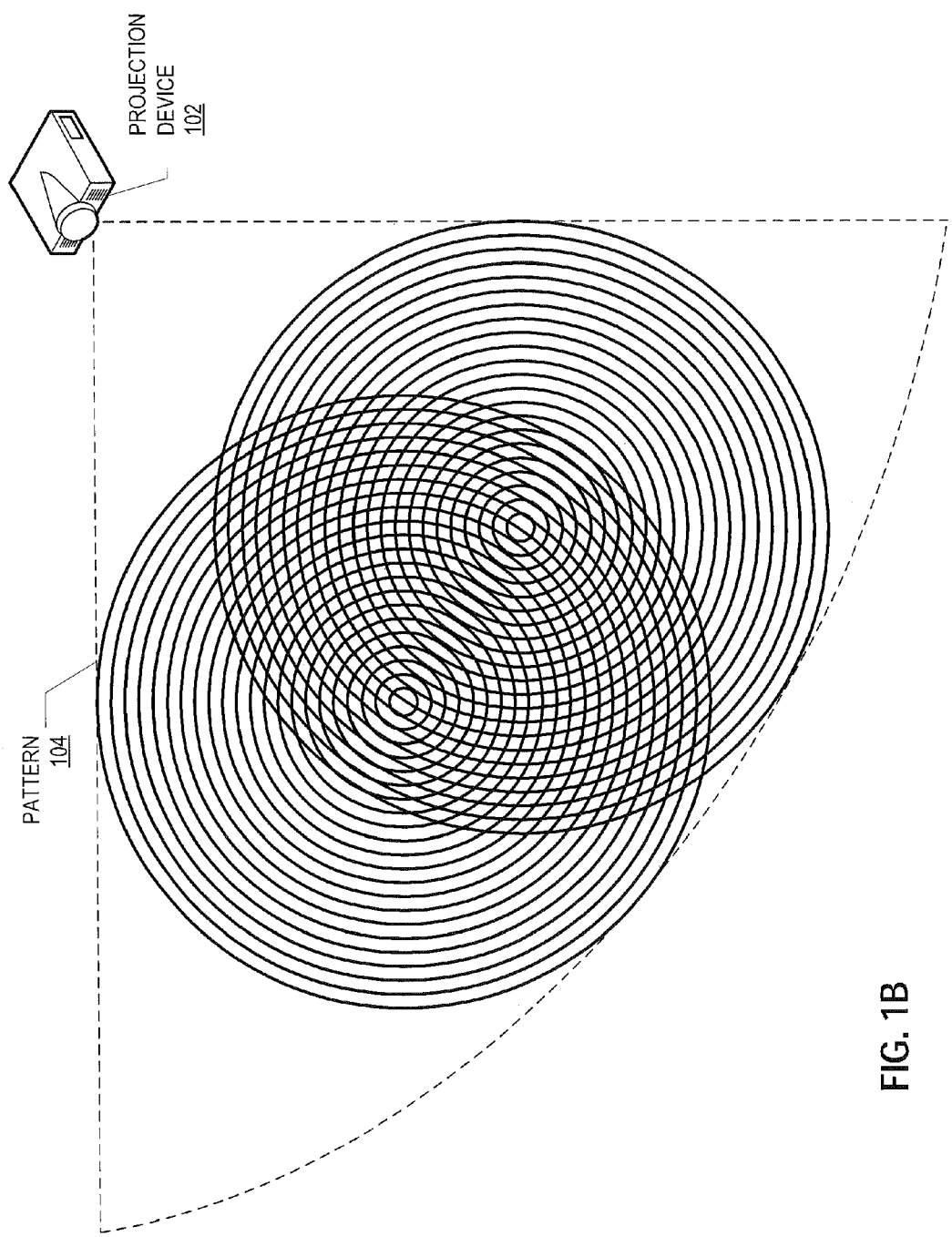

In some embodiments, the projection device 102 may have an invisible light projector (not shown) for projecting the pattern of invisible light 104. The invisible light may be infrared light or ultraviolet light. In either case, the pattern of invisible light 104 is projected onto a surface (e.g., floor, wall, etc.) such that each portion of the pattern of invisible light 104 may be uniquely identified. For example, the pattern of invisible light 104 may be overlapping concentric circles as shown in FIG. 1B. As shown in FIG. 1B, each portion of the overlapping concentric circles may be uniquely identified in the pattern of invisible light 104. In another example, the pattern of invisible light 104 may be an array of variable sized points of light. Additional examples of patterns of invisible 104 include, but are not limited to, grids, moiré patterns, polygons, labels (e.g., numeric labels, alpha-numeric labels, or other identifiers), undulating lines, etc.

In some embodiments, the invisible light projected by the projection device 102 is outside the visible spectrum of light detectable by the image capture device 112. In other words, the pattern of invisible light 104 does not appear in images captured by the image capture device 112. In contrast, the pattern of invisible light 104 does appear in pattern images captured by the invisible light sensor 114, which is configured to detect the frequency of light emitted by the projection device 102.

Returning to FIG. 1A, in some embodiments, the image collection system 106 may travel across the surface while collecting images using the image capture device 112 and related pattern images using the invisible light sensor 114. Each image from the image capture device 112 is associated with a related pattern image from the invisible light sensor 114 that was captured at approximately the same time as the image. In one embodiment, the related pattern image may be stored and associated with the image on the image collection device 110, where the images are processed at a later time to determine a relative location of a uniquely identifiable portion of the pattern of invisible light 104, e.g., by a data processing server. In another embodiment, the related pattern image from the invisible light sensor 114 may be processed on-board the image collection device 110 to determine the relative location of the uniquely identifiable portion with respect to the projection device 102.

In some embodiments, the image capture device 112 may be a multi-directional camera that is configured to simultaneously capture images at different orientations (e.g., azimuth and altitude of the optical axis). For example, the multiple images captured at a position may be merged to generate a cylindrical or spherical panorama (i.e., a panorama that allows for the perspective to be rotated on a horizontal and/or vertical plane). In either case, the image capture device 112 may be operatively connected to an input device (not shown) that allows the user to change the orientation of the image capture device 112 in real-time during the image captures. The image capture device 112 may also be configured to store the orientation as metadata with the captured images.

In some embodiments, the image collection system 106 may include a number of invisible light sensors (e.g., invisible light sensor 114) arranged so that multiple related pattern images may be obtained and associated with each image captured by the image capture device 112. For example, an invisible light sensor 114 may be installed at each of four sides of the image collection system 106. In some embodiments, the invisible light sensor 114 may capture pattern images at a higher rate than the image capture device 112 captures images. In this case, additional pattern images captured the invisible light sensor 114 may be used to more accurately define the position of the image collection system 106 as it is repositioned during image collection.

Figure 2A:
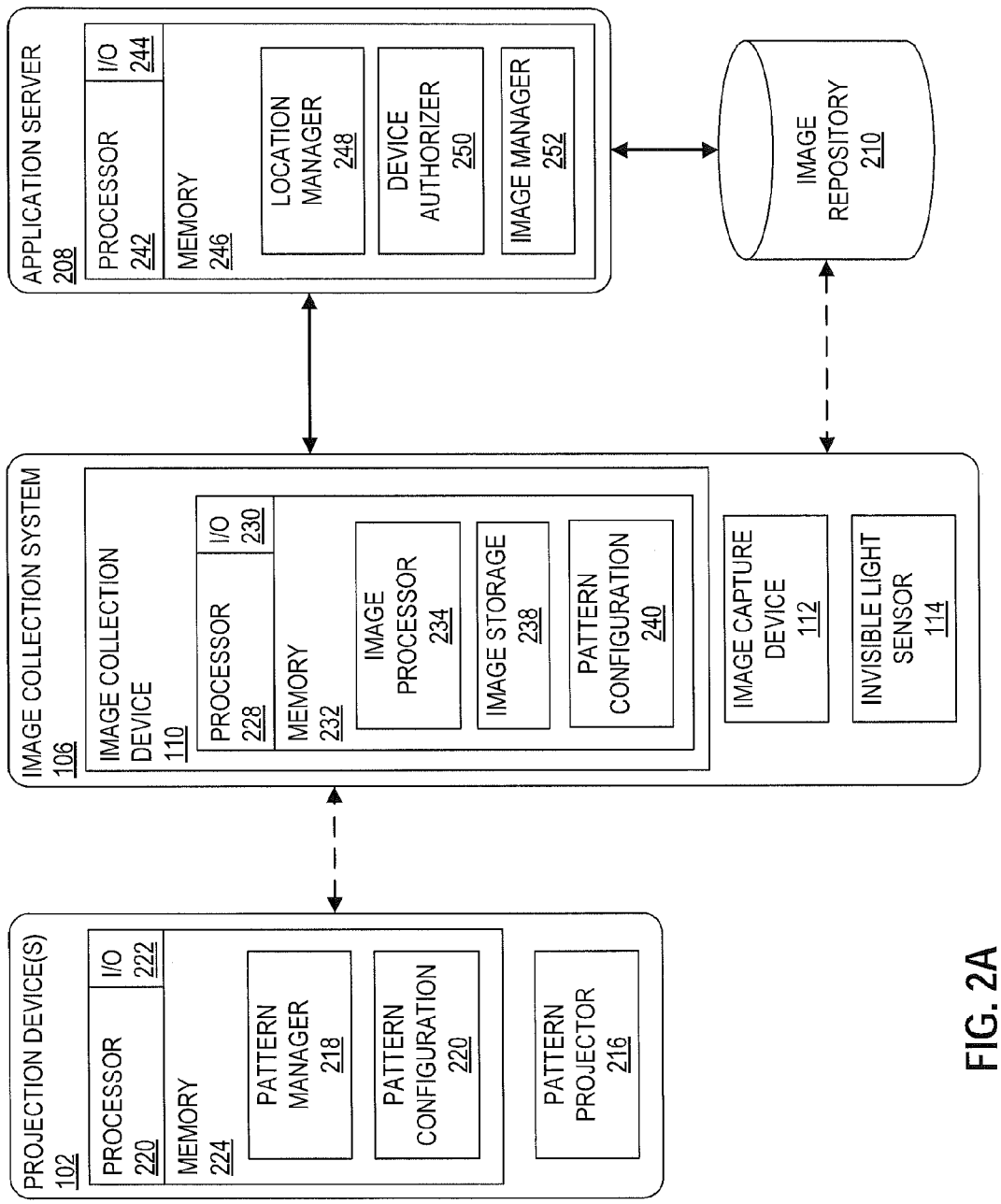

FIG. 2A shows a diagram of a system in accordance with some embodiments of image capture positioning using a pattern of invisible light. The example system includes projection device(s) 102 communicating with (e.g., interacting, receiving broadcasts from, or transmitting broadcasts to) an image collection system 106, which in turn interfaces with an application server 208. Further, the application server 208 of this embodiment stores information in an image repository 210.

In some embodiments, the projection device(s) 102 is configured to project a pattern of invisible light (e.g., infrared light, ultraviolet light, etc.) onto a surface. Specifically, the projection device(s) 102 may include a pattern projector 216 configured to project the pattern of invisible light, where a pattern manager 218 controls the operation of the pattern projector 216 based on a pattern configuration 220.

Figure 2B:
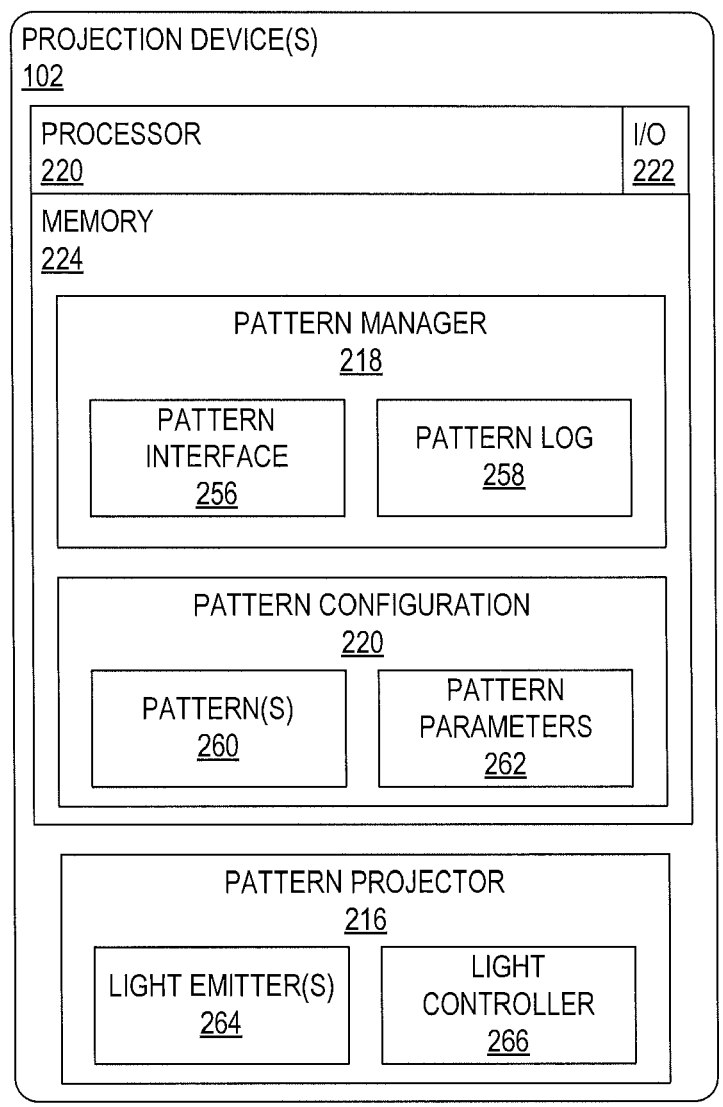

In some embodiments, the pattern manager 218 may include a pattern interface 256 of FIG. 2B that is configured to receive pattern configuration parameters. For example, the pattern interface 256 of FIG. 2B may be configured to provide a user interface to a user for manually entering pattern configuration parameters (e.g., selecting a pattern, entering location information, etc.). In another example, the pattern interface 256 of FIG. 2B may be configured to receive pattern configuration parameters from the image collection system 106. In some embodiments, the pattern interface 256 of FIG. 2B may store the pattern configuration parameters as pattern parameters 262 of FIG. 2B of the pattern configuration 220 of FIG. 2B. In some embodiments, the pattern manager 218 may include a pattern log 258 of FIG. 2B that stores historical data (e.g., time of operation, patterns projected, pattern parameters, etc.) related to the operation of the pattern projector 216.

In some embodiments, the pattern projector 216 may include light emitter(s) 264 of FIG. 2B that are configured to project the pattern of invisible light. For example, the light emitter(s) may be light emitting diodes (LED's) that irradiate invisible light. In this example, the LED's may be selectively activated in order to project various pattern(s) 260 of FIG. 2B. In some embodiments, the light emitter(s) 264 of FIG. 2B may be conventional LED's having a variety of inorganic semiconductor materials. For example, infrared LED's may be made from gallium arsenide or aluminum gallium arsenide, where the wavelength of the infrared light emitted is greater than 760 nm and the voltage drop is less than 1.9 V. In another example, ultraviolet LED's may be made from diamond, boron nitride, aluminum nitride, aluminum gallium nitride, or aluminum gallium indium nitride, where the wavelength of the ultraviolet light emitted is less than 400 nm and the voltage drop is greater than 3.1 V and less than 4.4 V.

In some embodiments, the pattern projector 216 may include a light controller 266 of FIG. 2B that is configured to control the operation of the light emitter(s) 264 of FIG. 2B based on the pattern parameters 262 of FIG. 2B. For example, the pattern parameters 262 of FIG. 2B may specify a pattern 260 of FIG. 2B to be projected by the light emitter(s) 264 of FIG. 2B. In this case, the pattern configuration 220 may include multiple pattern(s) 260 of FIG. 2B, where the pattern parameters 262 of FIG. 2B identify a selected pattern to be projected. In another example, the pattern parameters 262 of FIG. 2B may specify properties of the target surface (e.g., relative size of target area, surface material) to be projected upon by the pattern projector 216 of FIG. 2B.

In some embodiments, the light controller 266 of FIG. 2B may include a high-power, long-range driver for increasing the operating distance of the light emitter(s) 264 of FIG. 2B. The pattern projector 216 may also include reflector lens(es) and magnifying lens(es) (both not shown) to enhance the operating distance of the light emitter(s) 264 of FIG. 2B.

In some embodiments, the projection device(s) 102 includes a processor 220, an input/output module 222, and memory 224. The projection device(s) 102 may include various types of computing devices that execute an operating system. The processor 220 may execute instructions, including instructions stored in the memory 224. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 222 of the projection device(s) 102 may include an input module, such as a radio frequency sensor, a keyboard, and/or a mouse, and an output module, such as a radio frequency transmitter, a printer, and/or a monitor. The projection device(s) 102 may be connected to a local area network (LAN) or a wide area network (e.g., the Internet) via a network interface connection. In some embodiments, the input/output module 222 may take other forms.

In some embodiments, the image collection system 106 may be a vehicle including an image collection device 110 that is a computing device configured to collect images at the location. For example, the image collection device 110 may be a desktop computer, a laptop computer, an on-board computer of the vehicle, or other device configured to be readily transported by the image collection system 106 at the location. Examples of locations include the interior of a building, a stadium, or some other structure. The image collection device 110 may be installed on the vehicle, which is repositioned at the location as images are collected.

In some embodiments, the image collection system 106 includes an image capture device 112 that is configured to capture images, such as in a video format or as still images, including stereoscopic video or still images. For instance, the image capture device 112 may include one or more image sensors configured to capture images of light within the visible spectrum for use by the image collection system 106.

In some embodiments, the image collection system 106 includes an invisible light sensor 114 configured to capture pattern images of the pattern of invisible light projected from the projection device 102. The invisible light sensor 114 may be an infrared sensor or an ultraviolet sensor configured to capture pattern images as the image collection system 106 travels over a surface. In some embodiments, the image collection system 106 may include multiple invisible light sensors 114, where each invisible light sensor 114 is positioned to capture pattern images from a different side of a vehicle. In some embodiments, the invisible light sensor(s) 114 may be lined with mirrors or lenses in order to magnify, focus, or expand the detection range of incoming invisible light.

In some embodiments, the image capture device 112 and/or the invisible light sensor(s) 114 may be operatively connected to a distance sensor (not shown) that is configured to obtain associated distance information for captured images and/or pattern images. For example, a distance sensor may be used to determine the distance of the surface reflecting the pattern of invisible light 114, where the distance may be used to determine the relative location of the invisible light sensor(s) 114 at the time a pattern image is captured. In another example, a distance sensor may be used to determine the distance of objects in images captured by the image capture device 112, where the distance of objects may be used to perform object recognition analysis of the images.

In some embodiments, the image collection device 110 includes a processor 228, an input/output module 230, and a memory 232. The image collection device 110 may be implemented as a computing device with an operating system, stored in the memory 232, for interacting with a user. For example, the operating system may be configured to provide applications (e.g., an image collection application, a projector configuration application, etc.) to the user. In some embodiments, the memory 232 includes an image processor 234, a relative location determiner 236, a pattern configuration 240, and image storage 238.

In some embodiments, the image processor 234 of the image collection device 110 is configured to process images captured by the image capture device 112. In some embodiments, the image processor 234 may include an image manager 268 of FIG. 2C that is configured to manage the images captured by the image capture device 112. For example, the image manager 268 of FIG. 2C may be configured to (1) store images captured by the image capture device 112 in image storage 238; (2) transmit the stored images to the application server 208; and/or (3) control the image capture device 112 as directed by or configured by a user. In this example, the image manager 268 of FIG. 2C may control the image capture device 112 such that an image is obtained at regular intervals (e.g., distance intervals, time intervals, etc.) as the image collection system 106 is repositioned at the location. In some embodiments, the image storage 238 may be a local, tangible storage medium (e.g., random access memory, flash memory, etc.) of the image collection device 110.

Figure 2C:
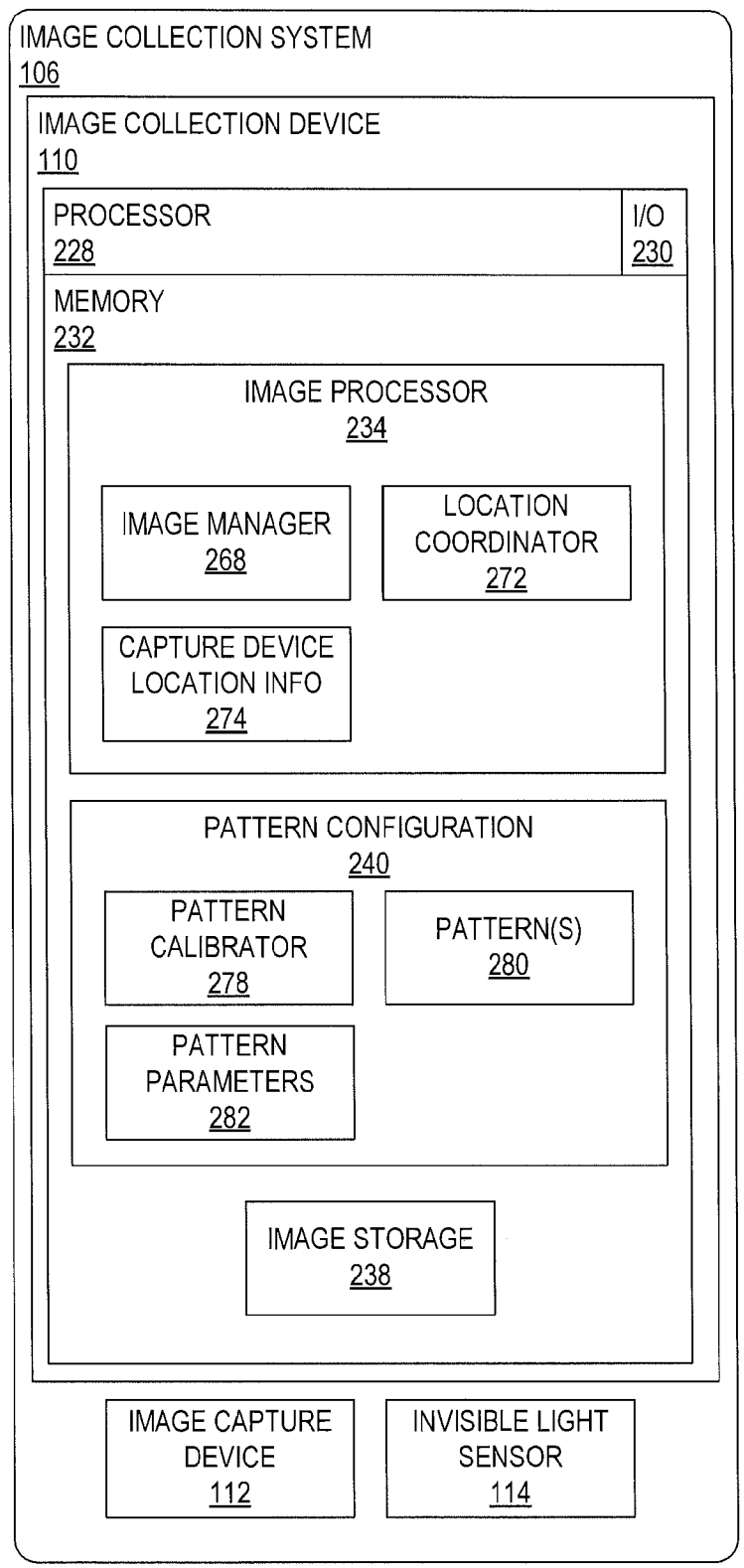

In some embodiments, the image processor 234 may include a location coordinator 272 of FIG. 2C that is configured to associate images with location information. For example, the location coordinator 272 of FIG. 2C may be configured to associate an image with relative location information obtained by the invisible light sensor 114 (e.g., pattern images). The relative location information may be stored separately from the stored image, where both are transmitted in a single unit to the application server 208. In some embodiments, the location coordinator 272 of FIG. 2C is configured to provide corresponding relative location information when stored images are retrieved by the image manager 268 of FIG. 2C as discussed above.

In some embodiments, the image manager 268 of FIG. 2C may be configured to associate other data with the images, e.g., the time at which an image was captured, camera settings and attributes of the image capture device 112, capture device location information 274 of FIG. 2C, an orientation and position of the invisible light sensor 114, pattern information (e.g., pattern parameters 282 of FIG. 2C, pattern(s) 280 of FIG. 2C), etc. For instance, the image capture device 112 may include an accelerometer (such as a 3-axis accelerometer or a 6-axis accelerometer), and based on signals from the accelerometer, aspects of the orientation of the image capture device 112, such as the azimuth and altitude of the optical axis or orientation between a portrait or landscape view (e.g., angular position of the image sensor about a horizontal axis) of the image capture device 112 may be associated with the image by the image manager 268 of FIG. 2C. The image capture device 112 may also include a magnetometer or other sensor configured to determine the azimuth of the image capture device 112 at the time the image is captured. The azimuth may also be associated with the image in the image storage 238. Alternatively or additionally, settings of the image capture device 112 may be associated with the image by the image manager 268 of FIG. 2C, such as resolution, exposure time, aperture, depth of focus, and post processing settings, such as white balance, compressing settings, and sharpness adjustments.

In some embodiments, the image processor 234 may include capture device location information 274 of FIG. 2C that defines a device location of the image capture device 112. For example, the capture device location information of FIG. 2C may describe the orientation of an optical axis, a position on the vehicle, etc. of the image capture device 112. In this example, the capture device location information of FIG. 2C may be provided to the application server 208 in order to enhance analysis of the relative location information that is associated with an image.

In some embodiments, the pattern configuration 240 of the image collection device 110 is configured to store pattern information describing the patterns of invisible light projected by the projection device(s) 102. The pattern configuration 240 may include pattern(s) 280 of FIG. 2C that describe the patterns used by the projection device(s) 102 when projecting invisible light. For example, the pattern(s) 280 of 2C may include a number of patterns (e.g., concentric circles, variable sized star array, grids, moiré patterns, polygons, numeric or alpha-numeric labels, undulating lines, etc.). In this example, the pattern(s) 280 may be preloaded onto the image collection device 110 and/or manually configured by the user.

In some embodiments, the pattern configuration 240 of the image collection device 110 may include pattern parameters 282 of FIG. 2C that describe the current pattern configuration of the projection device(s) 102. For example, the pattern parameters 282 of FIG. 2C may be determined by a user of the image collection device 110 when configuring the projection device(s) 102. In another example, the pattern parameters 282 of FIG. 2C may be obtained from preconfigured projection device(s) 102. The pattern parameters 282 of FIG. 2C may describe (1) a selected pattern to be projected by the projection device(s) 102 as invisible light; (2) a global location (e.g., determined by a global positioning device (GPS), etc.) of the projection device(s) 102; and (3) an orientation of a light emitter 264 of FIG. 2B of the projection device(s) 102. In some embodiments, the pattern parameters 282 of FIG. 2C associated with captured images are provided to the application server 208 for determining a relative location of the images with respect to the projection device(s) 102.

In some embodiments, the pattern configuration 240 of the image collection device 110 may include a pattern calibrator 278 of FIG. 2C configured to calibrate the image collection system 106 to the pattern of invisible light projected from the projection device(s) 102. For example, after the image collection system 106 is positioned at a known location with respect to the projection device(s) 102, the pattern calibrator 278 of FIG. 2C may be configured to calibrate the image collection system as it is repositioned over the pattern of invisible light. In this example, the image collection system 106 may include sensors for detecting a distance traveled (not shown) by the image collection system 106. The pattern images may be obtained by the invisible light sensor(s) 114 as the image collection system 106 travels a known distance from a known location, where the pattern images are then used to determine the placement of the pattern of invisible on the target surface.

In some embodiments, the application server 208 is a computing device configured to manage data for application services (e.g., image services, map services, etc.). In some embodiments, the application server 208 includes a processor 242, an input/output module 244, and a memory 246. The application server 208 may include various types of computing devices that execute an operating system. The processor 242 may execute instructions, including instructions stored in the memory 246. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 244 of the application server 208 may include an input module, such as a radio frequency sensor, a keyboard, and/or a mouse, and an output module, such as a radio frequency transmitter, a printer, and/or a monitor. The application server 208 may be connected to a local area network (LAN) or a wide area network (e.g., the Internet) via a network interface connection. In some embodiments, the input/output module 244 may take other forms.

Further, the application server 208 may be implemented as a node of a distributed system, where the other portions of the distributed system are located on different nodes. The nodes of the distributed system may correspond to computing devices as discussed above. Alternatively, the nodes of the distributed system may correspond to multiple processors/cores with shared memory in a single computing device. In some embodiments, the memory 246 of the application server 208 includes a location manager 248, a device authorizer 250, and an image manager 252. The aforementioned components of the application server 208 may be implemented on multiple computing devices (i.e., servers), where a load balancing scheme distributes requests across the multiple computing devices.

In some embodiments, the location manager 248 of the application server 208 is configured to determine global locations for images received from the image collection system 106. A global location may refer to a geographic location in a geographic coordinate system (e.g., geographic coordinates).

Figure 2D:
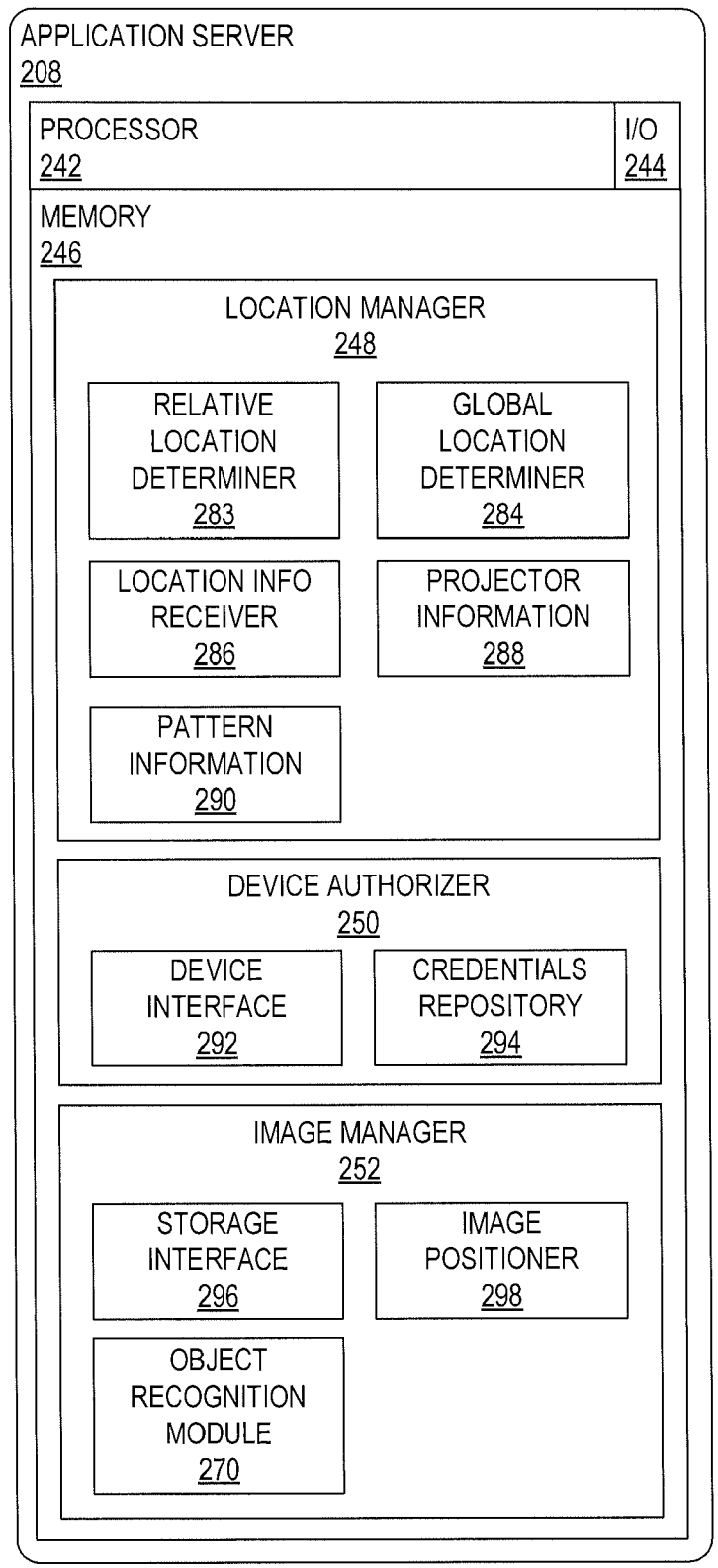

In some embodiments, the location manager 248 may include a relative location determiner 283 of FIG. 2D that is configured to determine a relative location of images received from the image collection system 106. Specifically, the relative location determiner 283 of FIG. 2D may be configured to determine a relative location of an image based on a pattern image of a portion of a pattern of invisible light that was projected from the projection device(s) 102 during image capture. For example, the relative location determiner 283 of FIG. 2D may determine the relative location of the image based on a pattern image originally captured by the invisible light sensor 114 of the image collection system 106. In this example, the relative location determiner 283 of FIG. 2D identifies the relative location of the portion of the pattern of invisible light based on pattern information 290 of FIG. 2D (e.g., grid parameters received from the image collection system 106). Specifically, the pattern information 290 of FIG. 2D may be used to determine the pattern of invisible light that was projected by the projection device(s) 102 during image capture, where the portion is compared to the pattern of invisible light to identify the relative location of the image. Once the relative location determiner 283 of FIG. 2D determines the relative location of the image, the relative location may be provided to the global location determiner 284 of FIG. 2D, which may then determine the global location of the image based on the relative location as discussed below. The relative location determiner 283 of FIG. 2D may also use other data associated with the image to determine the relative location, e.g., the time at which the image was captured, camera settings and attributes of the image capture device 112 when the image was captured, an orientation and position of the invisible light sensor 114 when the pattern image was captured, etc.

In some embodiments, the location manager 248 may include a global location determiner 284 of FIG. 2D that is configured to determine the global locations of images received from the image collection system 106. The global location determiner 284 of FIG. 2D may be configured to determine the global location of an image based on a geographic location of the projection device(s) 102 and a relative location of the image with respect to the projection device(s) 102. For example, the global location determiner 284 of FIG. 2D may determine the global location of the image by adjusting the geographic location (e.g., geographic coordinates) of the projection device(s) 102 based on the relative location (e.g., longitudinal and latitudinal distance from the geographic location of the projection device(s) 102) of the image. In some embodiments, the global location determiner 284 of FIG. 2D may be configured to store the global locations of the images in a repository (e.g., the image repository 210) as data records associated with the images.

In some embodiments, the location manager 248 may include a location information receiver 286 of FIG. 2D that is configured to receive relative location information associated with images from the device interface 292 of FIG. 2D. In one embodiment, the location information receiver 286 of FIG. 2D may be configured to store the relative location information in a repository (e.g., the image repository 210) as data records associated with the images. In another embodiment, the location information receiver 286 of FIG. 2D may be configured to provide the relative location information to the global location determiner 284 of FIG. 2D.

In some embodiments, the location manager 248 may include projector information 288 of FIG. 2D that defines properties of the projection device(s) 102. For example, the projector information 288 of FIG. 2D may include a geographic location of the projection device(s) 102, an orientation of the projection device(s) 102, operating parameters (e.g., time period of projection, brightness, type of invisible light, ambient conditions, etc.) of the projection device(s) 102, etc. The projection information 288 of FIG. 2D may be used by the global location determiner 284 of FIG. 2D as discussed above to determine the global locations of images.

In some embodiments, the location manager 248 may include pattern information 290 of FIG. 2D that defines properties of the pattern of invisible light projected by projection device(s) 102. Specifically, the pattern information 290 of FIG. 2D may include pattern(s) and pattern parameters similar to as discussed above with respect to the pattern configuration 220 of the projection device(s) 102. The pattern information 290 of FIG. 2D may be used by the relative location determiner 283 of FIG. 2D as discussed above to determine the relative locations of images. The relative locations may then be used by the global location determiner 284 of FIG. 2D as discussed above to determine the global locations of the images.

In some embodiments, the device authorizer 250 of the application server 208 is configured to manage sessions for the image collection system 106. For example, the device authorizer 250 of this embodiment includes a device interface 292 of FIG. 2D configured to authenticate credentials from the image collection system 106 when initiating a session. In this example, the image collection system 106 is not authorized to interact with the application server 208 until the credentials are confirmed to be valid by the device interface 292 of FIG. 2D. In some embodiments, the device authorizer 250 also includes a credentials repository 294 of FIG. 2D configured to store encrypted credentials used to authorize the image collection system 106.

In some embodiments, the device interface 292 of FIG. 2D may be configured to receive images and location information from the authorized image collection system 106. The images and location information received by the device interface 292 of FIG. 2D may be provided to the image manager 252 and the location manager 248, respectively, for further processing.

In some embodiments, the image manager 252 of the application server 208 is configured to manage images received from the image collection system 106. Specifically, the image manager 252 may include: (1) a storage interface 296 of FIG. 2D that is configured to store and retrieve the images in the image repository 210; (2) an image positioner 298 of FIG. 2D configured to position the images based on the global locations of the images; and (3) an object recognition module 270 of FIG. 2D configure to perform object recognition to identify objects. In some embodiments, the image positioner 298 of FIG. 2D may be configured to position images by matching the orientation of objects in different images.

In some embodiments, the image positioner 298 of FIG. 2D is configured to improve the image positioning process by using the global locations of the images. For example, the image positioner 298 of FIG. 2D may be configured to use the global locations of the images to account for different perspective points of each of the images when identifying matching objects in the images.

In some embodiments, the image processor 234 may include an object recognition module 270 of FIG. 2D that is configured to perform object recognition analysis on images obtained from the image collection system 106. For example, the object recognition module 270 of FIG. 2D may perform object recognition to identify objects (e.g., buildings, store fronts, signs, etc.) in the images. In this example, the objects identified by the object recognition module 270 of FIG. 2D may be used to position the images provided by the image collection system 106.

In some embodiments, the image repository 210 is configured to store images for use by application services (e.g., a map service, an image service). The stored images are related to location information (i.e., geographic coordinates), allowing the applications service to use the stored images as spatial data for providing search results, generating maps, etc. The image repository 210 may correspond to a server, a database, files, a memory cache, etc. that is stored locally (e.g., located on the application server) or shared on a network (e.g., a database server). The image collection system 106 may interact directly with the image repository 210 to store images captured in response to image requests. In some embodiments, metadata associated with the stored images is stored in a separate repository (not shown). For example, the image repository 210 and the separate repository may be organized in a distributed relational database architecture.

In some embodiments, the image repository 210, or a related repository, is configured to store information related to the stored images. For example, the image repository 210 may also store results of analysis (e.g., object recognition, etc.) performed on the stored images. In another example, the image repository 210 may also store metadata (e.g., geographic location of image, timestamp of image, format of image, etc.) related to the stored images.

Figure 3:
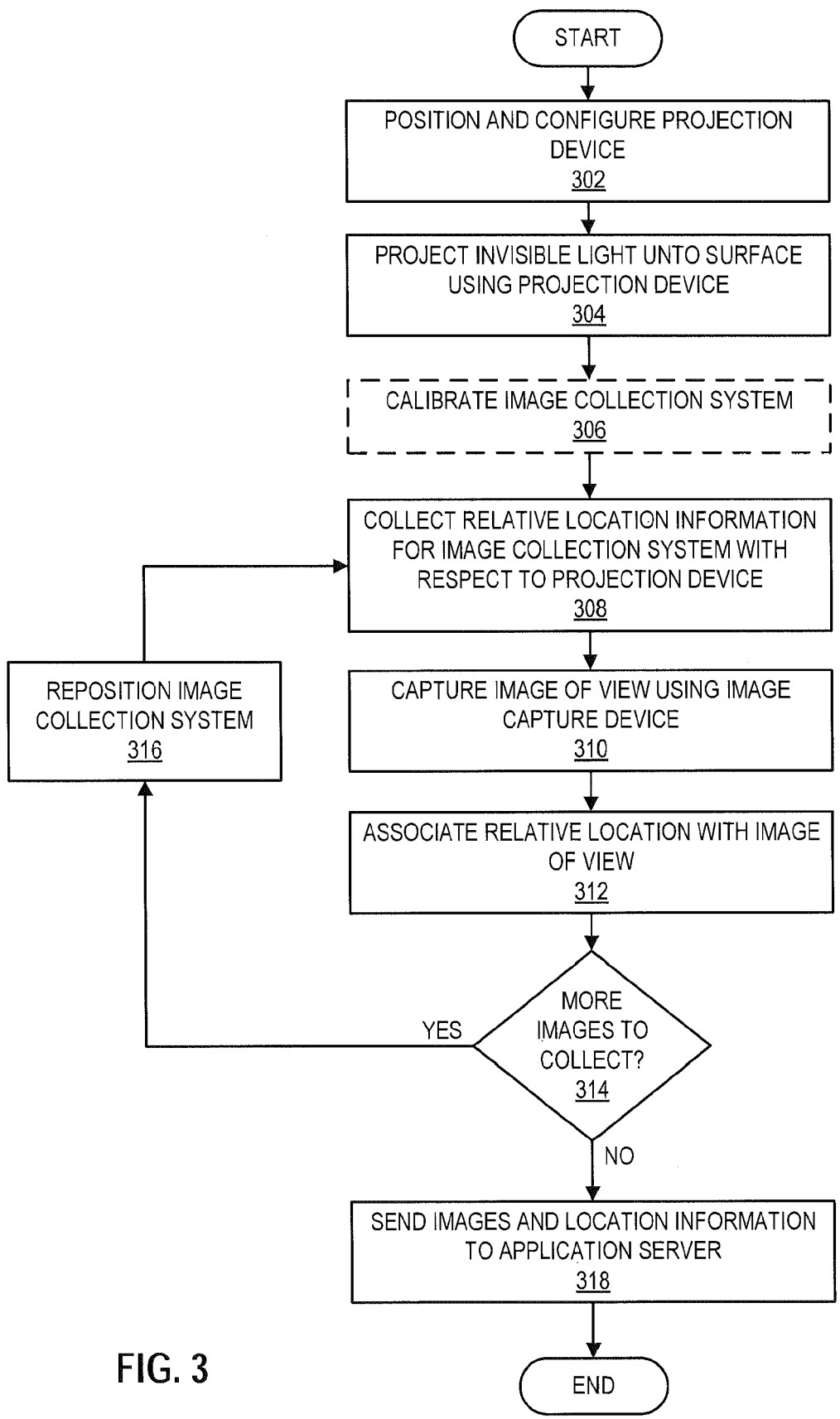
FIGS. 3-4 show flow charts in accordance with one or more embodiments.

FIG. 3 shows a flow chart in accordance with certain embodiments. More specifically, FIG. 3 is a flow chart of a method performed by an image collection system for capturing images of a location. Examples of locations include the interior of a building, a stadium, or some other structure. As is the case with the other processes described herein, various embodiments may not include all of the steps described below, may include additional steps, and may sequence the steps differently. Accordingly, the specific arrangement of steps shown in FIG. 3 should not be construed as limiting the scope of image capture positioning using a pattern of invisible light.

In step 302 of the present embodiment, projection device(s) are positioned and configured at the location. Specifically, the projection device(s) may be positioned in order to project a pattern of invisible light onto a surface at the location. In this case, the projection device(s) may be configured by a user selecting pattern parameters for the pattern of invisible light. For example, the pattern parameters may (1) select a pattern to be projected by the projection device(s); (2) specify properties of the target surface (e.g., relative size of target area, surface material) to be projected upon by the projection device(s); and/or (3) azimuth and altitude of the projection device(s). In this example, if multiple projection devices are used, the pattern parameters may include the relative location of each of the projection devices with respect to each other.

In step 304 of the present embodiment, the pattern of invisible light is projected onto the surface by the projection device(s). The projection device(s) may project the pattern of invisible light based on pattern parameters specified in step 302. For example, each of two projection devices may project concentric circles if the pattern of invisible light is overlapping concentric circles. In this example, each portion of the pattern of invisible light may uniquely identify a position with respect to the projection devices.

Optionally, in step 306 of the present embodiment, the image collection system may be calibrated to the pattern of invisible light. Specifically, the image collection system may be positioned at a known location with respect to the projection device(s) and then calibrated as the image collection system is repositioned over the pattern of invisible light. For example, the image collection system may include sensors for detecting a distance traveled by the image collection system. In this example, pattern images are obtained as the image collection system travels a known distance from a known location, where the pattern images are then used to determine the placement of the pattern of invisible.

In step 308 of the present embodiment, relative location information with respect to the projection devices is collected by the image collection system. The relative location information may include an image of a portion of the pattern of invisible light, a timestamp, orientation information for an invisible light sensor of the image collection system, cardinal direction of the image collection system, etc. In some embodiments, the image collection system may include multiple invisible light sensors for collecting relative location information.

In step 310 of the present embodiment, an image is captured by an image capture device of the image collection system. The image may be of a view at a current position of the image collection system captured at approximately the same time as the relative location information is collected in step 308. In some embodiments, multiple images may be captured by image capture devices that are optically directed towards different views at the current position. The image(s) captured may be associated with the relative location information collected in step 308 (or associated with the relative location determined in step 310).

In step 312 of the present embodiment, the relative location information is associated with the image. The relative location information may include pattern image(s) of the pattern of invisible light collected in step 308, pattern parameters selected in step 302, etc.

In step 314 of the present embodiment, a determination is made as to whether there are additional images to collect. If there are more images to collect, the image collection system is repositioned in 316 before the process returns to step 308. In this case, the image collection system may be repositioned continuously at the location as relative location information and images are obtained as described in steps 308-312.

If there are no more images to collect, the images and corresponding relative location information are transmitted to an application server for further processing in step 318. For example, the images and relative location information may be processed as discussed below with respect to FIG. 4.

Figure 4:
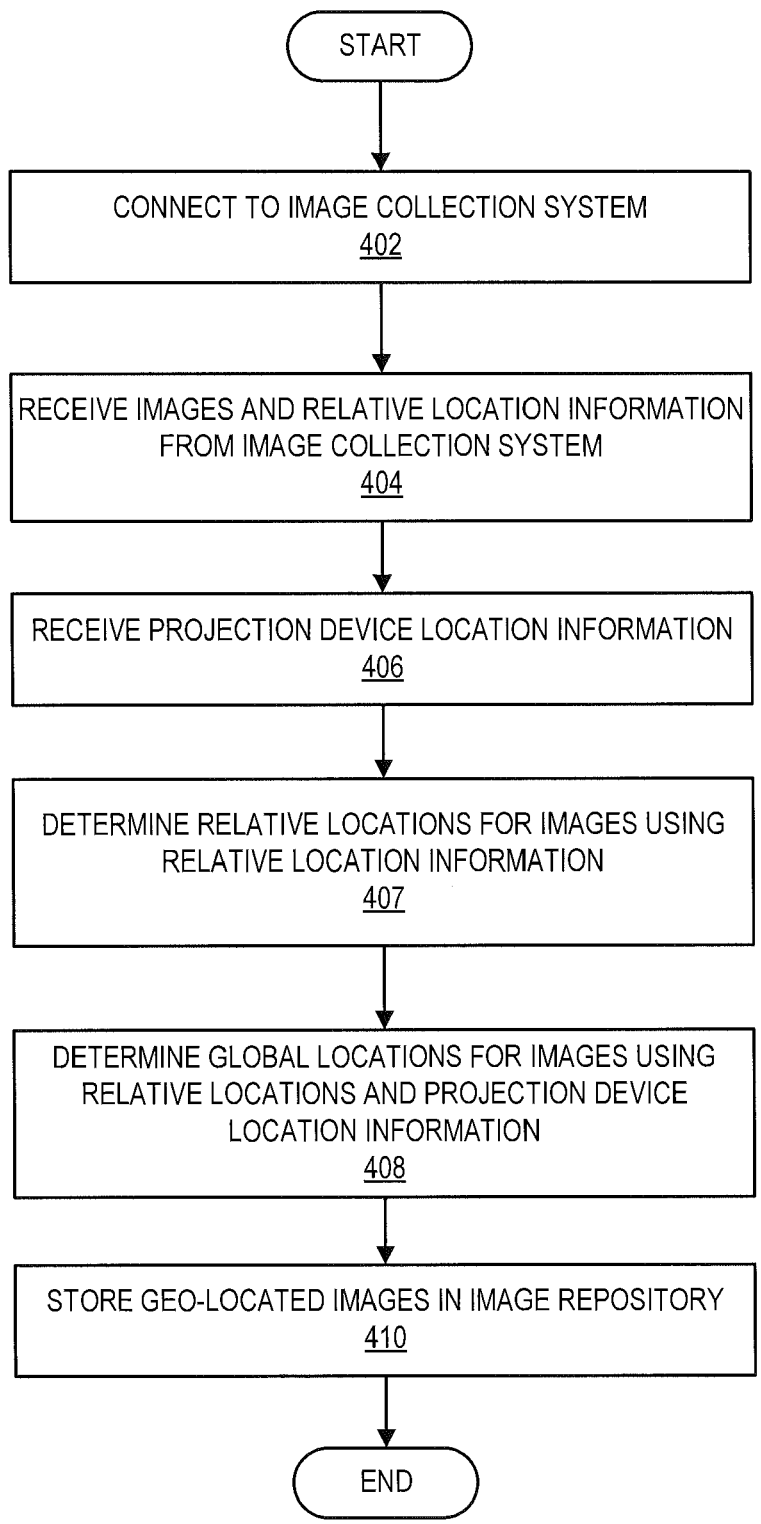

FIG. 4 shows a flow chart in accordance with certain embodiments of image capture positioning using a pattern of invisible light. More specifically, FIG. 4 shows a flow chart of a method performed by an application server for obtaining images at a location (e.g., interior of a building, stadium, or other structure). In one or more embodiments, one or more of the steps described below may be omitted, repeated, or performed in a different order. Accordingly, the specific arrangement of steps shown in FIG. 4 should not be construed as limiting the scope of image capture positioning using a pattern of invisible light.

In step 402 of the present embodiment, the application server connects to the image collection system. For example, the application server may connect to and authorize the image collection system over the Internet or some other wide area network. In this example, the process proceeds to step 404 after the image collection system is authorized.

In step 404 of the present embodiment, images and associated relative location information are received from the image collection system. The relative location information may describe the position of the image collection system with respect to a projection device as the images were captured by an image capture device. Specifically, each image may be associated with relative location information that defines the position of the image capture device with respect to the projection device at the time the image was captured. In some embodiments, the relative location may include pattern images of portions of a pattern of invisible light projected by the projection device, operating parameters of invisible light sensors that captured the pattern images, pattern parameters for the pattern of invisible light, etc.

In step 406 of the present embodiment, location information of the projection device is received. The location information may include a geographic location of the projection device. For example, the geographic location may be determined by a GPS sensor of the projection device. In another example, the geographic location may be manually entered by a user of the image collection system.

In step 407 of the present embodiment, a relative location of the image collection system at the time each image was captured is determined based on the relative location information. The relative location may be determined by identifying the portion of the pattern of invisible light in each associated pattern image with respect to the projection device(s). For example, the relative location may be determined as a longitudinal and latitudinal distance from the projection device(s) based on the location of the portion in the pattern of invisible light. In this example, the application server may use the pattern parameters of the projection device to determine (1) the pattern of invisible light that was projected by the projection device during image capture and (2) the relative location of the portion in each pattern image within the pattern of invisible light.

In step 408 of the present embodiment, global locations are determined based on the relative locations and the location information of the projection device. Specifically, a global location is determined for each image based on the relative location of the image with respect to the geographic location of the projection device. In this case, the relative location may be a longitudinal and latitudinal distance that is used to offset the geographic location of the projection device to determine the global location of the image.

In step 410 of the present embodiment, geographically-located images are stored in an image repository. Each of the stored images is associated with a global location (e.g., embedded metadata of the stored images, data records associated with the stored images) in the image repository.

Figure 5:
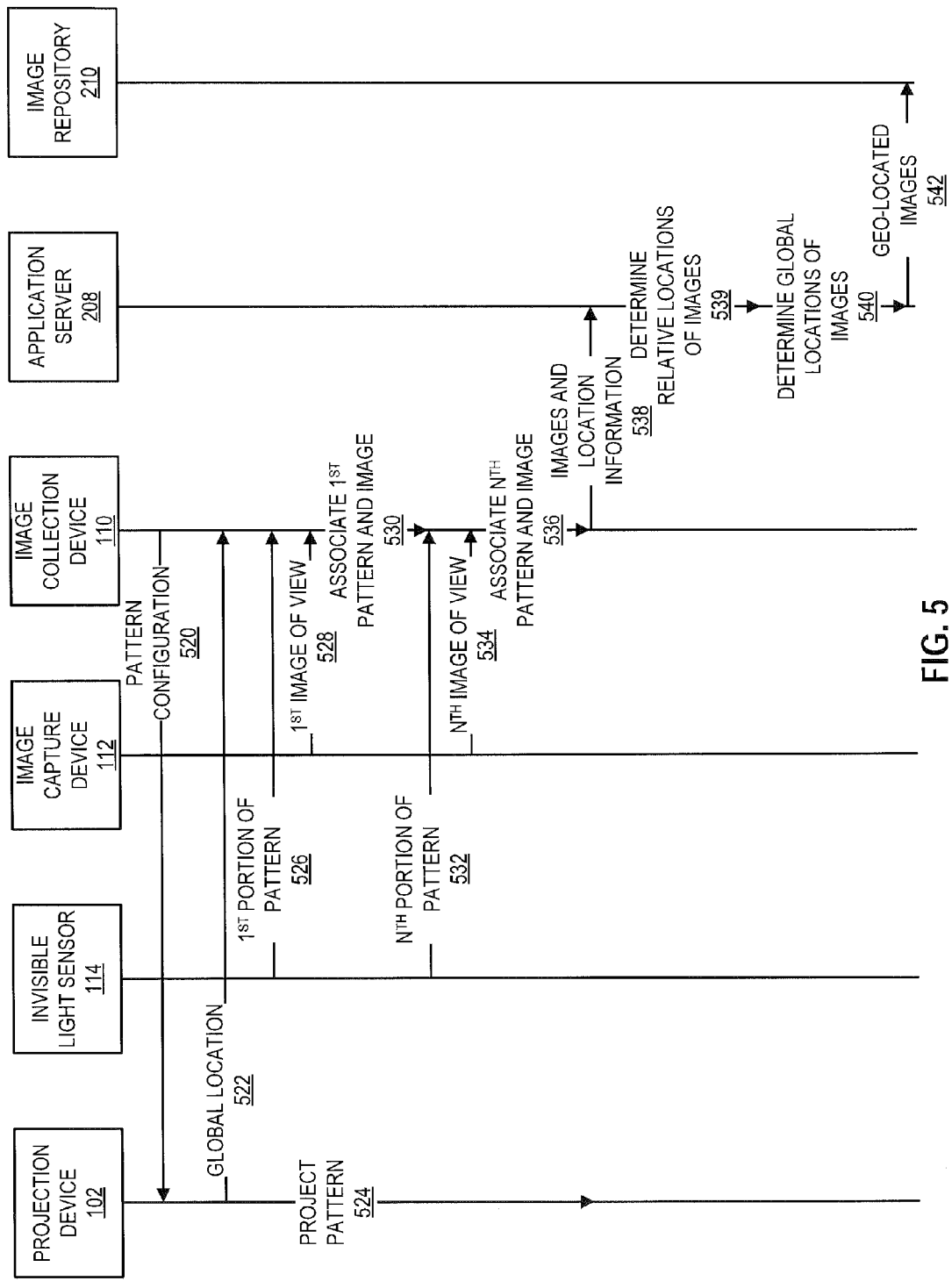
FIG. 5 shows a data flow diagram in accordance with one or more embodiments.

FIG. 5 shows another example in accordance with embodiments of image capture positioning using a pattern of invisible light. More specifically, FIG. 5 shows an example of obtaining images for an application server using the pattern of invisible light. The example includes a positioning device 102, an invisible light sensor 114, an image capture device 112, an image collection device 110, an application server 208, and an image repository 210, which may be substantially similar to their corresponding components discussed above with respect to FIGS. 1 and 2.

In step 520 of the present embodiment, the image collection device 110 provides a pattern configuration to the projection device 102. For example, a user of the image collection device 110 may select pattern parameters that are transmitted to the project device 102. In step 522 of the present embodiment, a global location of the projection device 102 is sent to the image collection device 110. For instance, the global location may be determined using a GPS sensor of the projection device 102.

In step 524 of the present embodiment, the projection device 102 projects a pattern of invisible light based on the pattern configuration received from the image collection device 110. The pattern of invisible light is projected onto a surface at a target location (e.g., shopping mall, sports stadium, museum, etc.), where the pattern of invisible light may be used to determine a relative location of a vehicle including the image collection device 110, the image capture device 112, and an invisible light sensor 114. The vehicle may be repositioned at the location as discussed below as images are obtained at regular intervals (e.g., regular time intervals, regular distance intervals, a video stream of images, etc.). For example, the vehicle may travel throughout a shopping mall to obtain images of each store in the shopping mall.

In step 526 of the present embodiment, a first pattern image of a first portion of the pattern of invisible light is captured by the invisible light sensor 114 and transmitted to the image collection device 110. As approximately the same time, a first image at the location may be captured by the image capture device 112 and transmitted to the image collection device 110. The first pattern image and the first image are captured at a first position of the vehicle as the vehicle is repositioned at the target location.

In step 530 of the present embodiment, the image collection device 110 may associate the first pattern image with the first image captured by the image capture device 112. After the first pattern image and first image are obtained, the image collection device 110, the image capture device 112, and the invisible light sensor 114 are repositioned (e.g., by a vehicle) to a different position at the target location. In steps 532-536 of the present embodiment, the image collection process is repeated to collect additional pattern images and images of the location as the image collection device 110, image capture device 112, and invisible light sensor 114 are repositioned. For example, a vehicle having the three components may travel throughout the location as the pattern images and images are captured at fixed intervals. In this example, the pattern images may be collected at a higher rate than the images to obtain additional relative location information.

In step 538 of the present embodiment, the images of the location and their associated location information are provided to the application server 208 by the image collection device 110. For example, the image collection device 110 may provide (1) the images; (2) the pattern images associated with the images; (3) pattern information; and (4) the global location of the projection device at the time the images were captured to the application server 508.

In step 539 of the present embodiment, the relative locations of the images are determined by the application server 508. For example, the pattern image associated with each image may be analyzed to identify a relative location of the image with respect to the pattern of invisible light that was projected by the projection device 102 during the image capture. In this example, the relative location may be identified as a uniquely identifiable portion of the pattern of invisible light that is included in the pattern image.

In step 540 of the present embodiment, the global locations of the images are determined by the application server 508.

For example, the global location of each image may be determined by using the relative location (e.g., longitudinal and latitudinal distance from projection device) of the image to offset the global location of the projection device.

In step 542 of the present embodiment, the geographically-located images are stored in the image repository 210. For example, the global locations may be stored with the images as embedded metadata. In another example, the global location may be stored as data records that are associated with the stored images.

While image capture positioning using a pattern of invisible light has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present embodiments may suitably comprise, consist or consist essentially of the elements disclosed and may be practiced in the absence of an element not disclosed.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

I claim:

1. A method for capturing images, the method comprising:
projecting, by a projection device, a pattern of invisible light onto a surface;
positioning a vehicle at an image capture position on the surface, the vehicle comprising an image capture device oriented to capture an image of a view at the image capture position;
capturing, by an invisible light sensor connected to the vehicle, a pattern image at the image capture position, the pattern image comprising at least a portion of the pattern of invisible light projected onto the surface; and
sending the pattern image to an application server, the application server determining the image capture position relative to the projection device based on the portion of the pattern of invisible light.

2. The method of claim 1, wherein the pattern of invisible light comprises a plurality of overlapping concentric circles, an array of variable sized points of light, a grid, a moiré pattern, a plurality of polygons, a plurality of alphanumeric labels, or a plurality of undulating lines.

3. The method of claim 1, wherein the image capture position relative to the projection device is determined by uniquely identifying a relative location of the portion in the pattern of invisible light.

4. The method of claim 1, further comprising:
capturing a plurality of images while the vehicle is moved from a first position to a second position on the surface;
capturing a plurality of pattern images while the vehicle is moved from the first position to the second position; and
sending the plurality of images and the plurality of pattern images to the application server, the application server determining a corresponding image capture position of the vehicle relative to the position device for each of the plurality of images based on a related pattern image of the plurality of pattern images.

5. The method of claim 1, further comprising:
calibrating an image collection device, operatively connected to the image capture device, by using the pattern of invisible light to determine a location of the projection device, wherein the image capture position relative to the projection device is further determined based on the location of the projection device.

6. The method of claim 1, wherein the pattern of invisible light is a pattern of infrared light.

7. The method of claim 1, further comprising:
storing a pattern configuration on the projection device, wherein the pattern of invisible light is projected based on the pattern configuration; and
determining a global location of the projection device.

8. The method of claim 7, further comprising:
sending the image to the application server, the application server deteiniining a global location of the view based on the global location of the projection device and the image capture position relative to the global location of the projection device.

9. A method for capturing images, the method comprising:
receiving a pattern configuration that describes a pattern of invisible light, the pattern of invisible light being projected by a projection device based on the pattern configuration;
receiving a pattern image of a portion of the pattern of invisible light, the pattern image being captured at an image capture location;
receiving an image of a view captured at the image capture location; and
determining the image capture location relative to the projection device based on the portion of the pattern of invisible light.

10. The method of claim 9, further comprising:
receiving a global location of the projection device; and
determining a global location of the view based on the global location of the projection device and the image capture location relative to the global location of the projection device.

11. A system, comprising:
a projection device to project a pattern of invisible light onto a surface, the pattern of invisible light being projected based on a pattern configuration;
a vehicle positioned at an image capture position on the surface;
an invisible light sensor, connected to the vehicle, to capture a pattern image, the pattern image comprising at least a portion of the pattern of invisible light;
an image collection device to send the pattern configuration and the pattern image to an application server; and an image capture device operatively connected to the image collection device and oriented to capture an image of a view at the image capture position.

12. The system of claim 11, further comprising the application server to:
receive the pattern configuration and the pattern image from the image collection device;
receive the image of the view captured at the image capture position; and
determine the image capture position relative to the projection device based on the portion of the pattern of invisible light.

13. The system of claim 11, wherein the image capture device is further to capture a plurality of images while the vehicle is moved from a first position to a second position on the surface, and wherein the invisible light sensor is further to capture a plurality of pattern images while the vehicle is moved from the first position to the second position, and wherein the image collection device is further to associate each image of the plurality of images with a corresponding pattern image of the plurality of pattern images.

14. The system of claim 11, wherein the image collection device is further to:
calibrate the image collection device by using the pattern of invisible light to determine a location of the projection device; and
send the location of the projection device to the application server.

15. The system of claim 11, wherein the projection device is further to:
store the pattern configuration that is used to project the pattern of invisible light; and
determine a global location of the projection device.

16. The system of claim 15, wherein the image collection device is further to:
generate the pattern configuration based on input from a user of the image collection device; and
send the pattern configuration to the projection device.

17. A non-transitory computer readable medium having computer-executable program instructions embodied therein that when executed cause a computer processor to:
receive, from an invisible light sensor connected to a vehicle, a pattern image comprising at least a portion of a pattern of invisible light projected onto a surface, the pattern image being captured at an image capture position;
track a movement of the vehicle over the surface;
receive, from an image capture device, an image of a view at the image capture position;
send the image and the pattern image to an application server, the application server determining the image capture position relative to the positioning device based on the pattern image.

18. The non-transitory computer readable medium of claim 17, wherein the computer-executable program instructions when executed further cause the processor to:
receive a plurality of images while the vehicle is moved from a first position to a second position on the surface;
receive a plurality of pattern images while the vehicle is moved from the first position to the second position; and
send the plurality of images and the plurality of pattern images to the application server, the application server determining a corresponding image capture position of the vehicle relative to the position device for each of the plurality of images based on a related pattern image of the plurality of pattern images.

19. The non-transitory computer readable medium of claim 17, wherein the computer-executable program instructions when executed further cause the processor to:
determine a location of the projection device by analyzing the pattern of invisible light from a known location with respect to the projection device,
wherein the image capture position relative to the projection device is further determined based on the location of the projection device.

20. The non-transitory computer readable medium of claim 17, wherein the computer-executable program instructions when executed further cause the processor to:
generate the pattern configuration based on input from a user of the image collection device; and
send the pattern configuration to the projection device, wherein the pattern of invisible light is projected based on the pattern configuration.

21. The non-transitory computer readable medium of claim 17, wherein the computer-executable program instructions when executed further cause the processor to:
determine a global location of the projection device; and
send the global location of the projection device to the application server, the application server determining a global location of the view based on the global location of the projection device and the image capture position relative to the global location of the projection device.

* * * * *